US009179137B2

(12) United States Patent
Lee et al.

(10) Patent No.: US 9,179,137 B2
(45) Date of Patent: Nov. 3, 2015

(54) GATE DRIVER AND ORGANIC LIGHT EMITTING DIODE DISPLAY INCLUDING THE SAME

(75) Inventors: Hyunhaeng Lee, Jung-ri (KR); Kisu Park, Goyang-si (KR); Joongsun Yoon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 492 days.

(21) Appl. No.: 13/243,089

(22) Filed: Sep. 23, 2011

(65) Prior Publication Data

US 2012/0098826 A1 Apr. 26, 2012

(30) Foreign Application Priority Data

Oct. 20, 2010 (KR) .................. 10-2010-0102254

(51) Int. Cl.
| | |
|---|---|
| G06T 15/00 | (2011.01) |
| G09G 5/00 | (2006.01) |
| G11C 19/00 | (2006.01) |
| H04N 13/04 | (2006.01) |
| G09G 3/00 | (2006.01) |
| G09G 3/32 | (2006.01) |

(52) U.S. Cl.
CPC ........... H04N 13/0438 (2013.01); G09G 3/003 (2013.01); G09G 3/3266 (2013.01); H04N 13/0452 (2013.01); H04N 13/0497 (2013.01); G09G 2310/0286 (2013.01)

(58) Field of Classification Search
USPC ....................... 345/419, 204, 214, 98, 99, 100
See application file for complete search history.

(56) References Cited

U.S. PATENT DOCUMENTS

| | | | | |
|---|---|---|---|---|
| 4,833,421 A | * | 5/1989 | Hanson ........................ | 330/252 |
| 2003/0174111 A1 | * | 9/2003 | Ito .................................... | 345/89 |
| 2005/0134762 A1 | * | 6/2005 | Sung et al. ..................... | 349/96 |
| 2006/0074921 A1 | * | 4/2006 | Lefevre ......................... | 707/100 |
| 2007/0047058 A1 | * | 3/2007 | Lim .............................. | 359/267 |
| 2008/0095297 A1 | * | 4/2008 | Jang ................................ | 377/81 |
| 2010/0321478 A1 | * | 12/2010 | Sliwa et al. ..................... | 348/51 |
| 2011/0157158 A1 | * | 6/2011 | Hasegawa et al. ............ | 345/419 |

FOREIGN PATENT DOCUMENTS

TW 200301455 7/2003

OTHER PUBLICATIONS

Office Action issued in corresponding Taiwan Patent Application No. 100134111, mailed Feb. 12, 2014, 15 pages.

* cited by examiner

*Primary Examiner* — Stephen R Koziol
*Assistant Examiner* — Sohum Kaji
(74) *Attorney, Agent, or Firm* — Brinks Gilson & Lione

(57) ABSTRACT

A gate driver and an organic light emitting diode (OLED) display including the gate driver are disclosed. The gate driver includes a shift register block including a plurality of cascade-connected shift registers, a selection block including a plurality of selection units, which are respectively connected to the plurality of shift registers, and a buffer block including a plurality of buffers, which are respectively connected to the plurality of selection units. Each of the shift registers outputs a scan pulse, whose a phase is shifted by one horizontal period, in response to a start voltage, a first clock, a second clock, and a third clock.

14 Claims, 12 Drawing Sheets

FIG. 5

|  | SEL | SEB | SE |
|---|---|---|---|
| 2D MODE | Low | High | High |
| 3D MODE P1 | High | Low | High |
| 3D MODE P2 | High | High | High |
| 3D MODE P3 | High | High | Low |
| 3D MODE P4 | High | High | High |

GATE DRIVER AND ORGANIC LIGHT EMITTING DIODE DISPLAY INCLUDING THE SAME

This application claims the benefit of Korean Patent Application No. 10-2010-0102254 filed on Oct. 20, 2010, which is incorporated herein by reference for all purposes as if fully set forth herein.

BACKGROUND OF THE DISCLOSURE

1. Field of the Disclosure

The present application relates to a gate driver and an organic light emitting diode (OLED) display including the gate driver.

2. Discussion of the Related Art

Recently, the development of various flat panel displays is being accelerated. As a type of flat panel display, organic light emitting diode (OLED) displays use self-emitting elements, and thus have a fast response time, excellent emission efficiency, high brightness, and a wide viewing angle.

The OLED display includes an organic light emitting diode (OLED) in each pixel. The OLED includes an organic compound layer formed between an anode electrode and a cathode electrode. The organic compound layer includes a hole injection layer, a hole transport layer, a light emitting layer, an electron transport layer, and an electron injection layer. When a driving voltage is applied to the anode electrode and the cathode electrode, holes passing trough the hole transport layer and electrons passing through the electron transport layer move to the light emitting layer to form excitons. As a result, the light emitting layer generates visible light.

The OLED display arranges the pixels each including the OLED in a matrix form and controls brightness of the pixels based on a gray level of video data. The OLED display selectively turns on thin film transistors (TFTs) serving as an active element to thereby select the pixels. Further, the OLED display maintains the light emission of the pixels using a voltage stored in a storage capacitor.

Recently, research is being actively conducted for realizing a three-dimensional (3D) image as well as a two-dimensional (2D) image by using an OLED display as a display device. Among the types of OLED displays that are being currently manufactured for realizing a 3D image, there are a polarization glasses type and a liquid crystal shutter glasses type.

In the liquid crystal shutter glasses type OLED displays, a left eye image and a right eye image are alternately displayed on a display panel in unit of one frame, and left and right eye shutters of liquid crystal shutter glasses open and close in synchronization with a display timing, thereby implementing the 3D image. The liquid crystal shutter glasses open only the left eye shutter during nth frame periods, in which the left eye image is displayed, and open only the right eye shutter during (n+1)th frame periods, in which the right eye image is displayed, thereby making binocular disparity in a time division method.

The OLED display includes a gate driver for driving gate lines formed in the display panel. In other words, the OLED display includes a scan driver for driving scan lines and an emission driver for driving emission lines. The scan driver supplies a scan pulse for determining an addressing time of data to the scan lines, and the emission driver supplies an emission pulse for determining a light emitting time of the pixels to the emission lines. During a period in which data is addressed, the scan pulse of a turn-on level (or an active level) and the emission pulse of a turn-off level (or an inactive level) are generated. During a period in which the pixels emit light, the scan pulse of the turn-off and the emission pulse of the turn-on level are generated. The gate driver is formed in a non-display area of the display panel through the same process as the TFTs of the pixels based on a gate-in-panel (GIP) type.

In the GIP-based gate driver, the emission driver receives the scan pulse from the scan driver and generates the emission pulse with the scan pulse. The scan pulse is generally generated so that a phase of the scan pulse having a predetermined width is shifted by about one horizontal period. Thus, the emission pulse is inevitably generated depending on the scan pulse such that the phase of the emission pulse is shifted by about one horizontal period.

As a result, the related art GIP-based gate driver is merely applied to a sequential light emission for realizing the 2D image as in a portion A of FIG. 1 and is not applied to a simultaneous light emission for realizing the 3D image as in a portion B of FIG. 1. To realize simultaneous light emission, the emission pulses respectively supplied to all of the emission lines are required to be simultaneously generated at the turn-on level in a period in which the left eye image or the right eye image is displayed.

SUMMARY

A gate driver comprises a shift register block including a plurality of cascade-connected shift registers, each of the plurality of shift registers sequentially outputting a scan pulse, whose a phase is shifted by one horizontal period, in response to a start voltage, a first clock, a second clock, and a third clock; a selection block including a plurality of selection units, which are respectively connected to the plurality of shift registers, the plurality of selection units receiving the scan pulse and the third clock as input, each of the plurality of selection units applying the scan pulse to a first output node of the selection unit in response to a selection signal to sequentially set the first output nodes of the selection units at the turn-on level, and applying the third clock to a second output node of the selection unit in response to the selection signal to sequentially set the second output node of the selection units at the turn-on level, simultaneously setting the first output node at the turn-on level based on a first common control signal in response to the selection signal, and simultaneously setting the second output node at the turn-on level based on a second common control signal in response to the selection signal; and a buffer block including a plurality of buffers, which are respectively connected to the plurality of selection units, each of the plurality of buffers generating an emission pulse of the turn-off level since immediately after the first output node is set at the turn-on level to immediately before the second output node is set at the turn-on level and generating the emission pulse of the turn-on level immediately after the second output node is set at the turn-on level.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain, the principles of the invention. In the drawings:

FIG. 5 illustrates logic levels of control signals applied to a selection block in each of a 2D mode and a 3D mode;

DETAILED DESCRIPTION OF THE ILLUSTRATED EMBODIMENTS

Reference will now be made in detail to the specific embodiments of the present invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the present invention Exemplary embodiments of the present invention will be described with reference to FIGS. 2 to 13.

FIGS. 2 to 10 illustrate a gate driver according to an exemplary embodiment of the invention.

Figure 2:
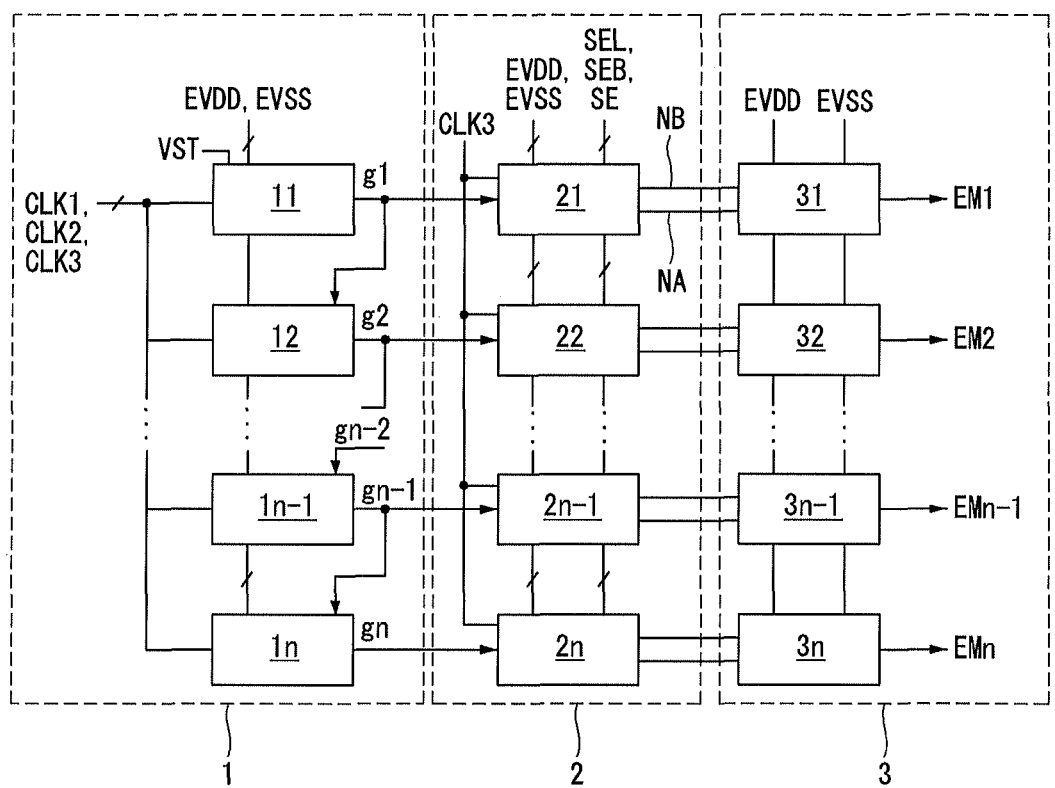
FIG. 2 is a schematic block diagram of a gate driver according to an example embodiment of the invention.

As shown in FIG. 2, a gate driver according to an exemplary embodiment of the invention includes a shift register block 1, a selection block 2, and a buffer block 3.

The shift register block 1 includes a plurality of shift registers 11 to 1n, which are cascade-connected to one another. The plurality of shift registers 11 to 1n output scan pulses g1 to gn respectively, each of which has a width of about one horizontal period and has a phasedelayed by about one horizontal period with respect to a preceding one.

Figure 3:
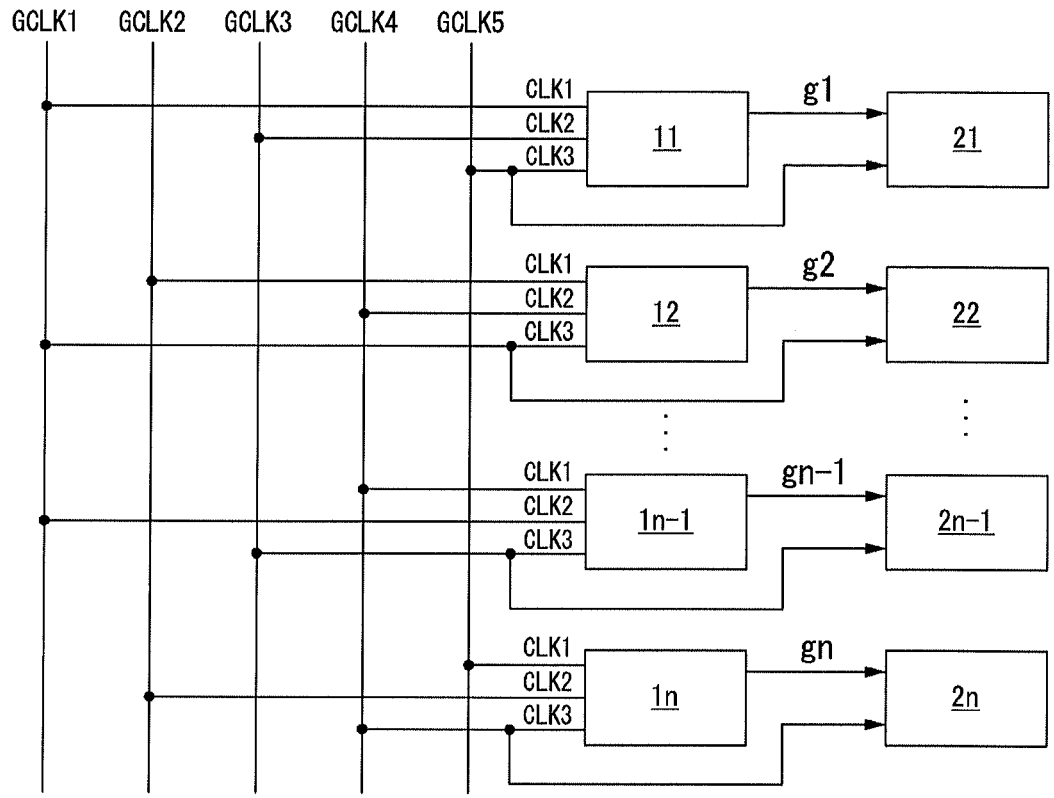
FIG. 3 illustrates three clocks which are selected from 5-phase gate clocks.
Figure 9:
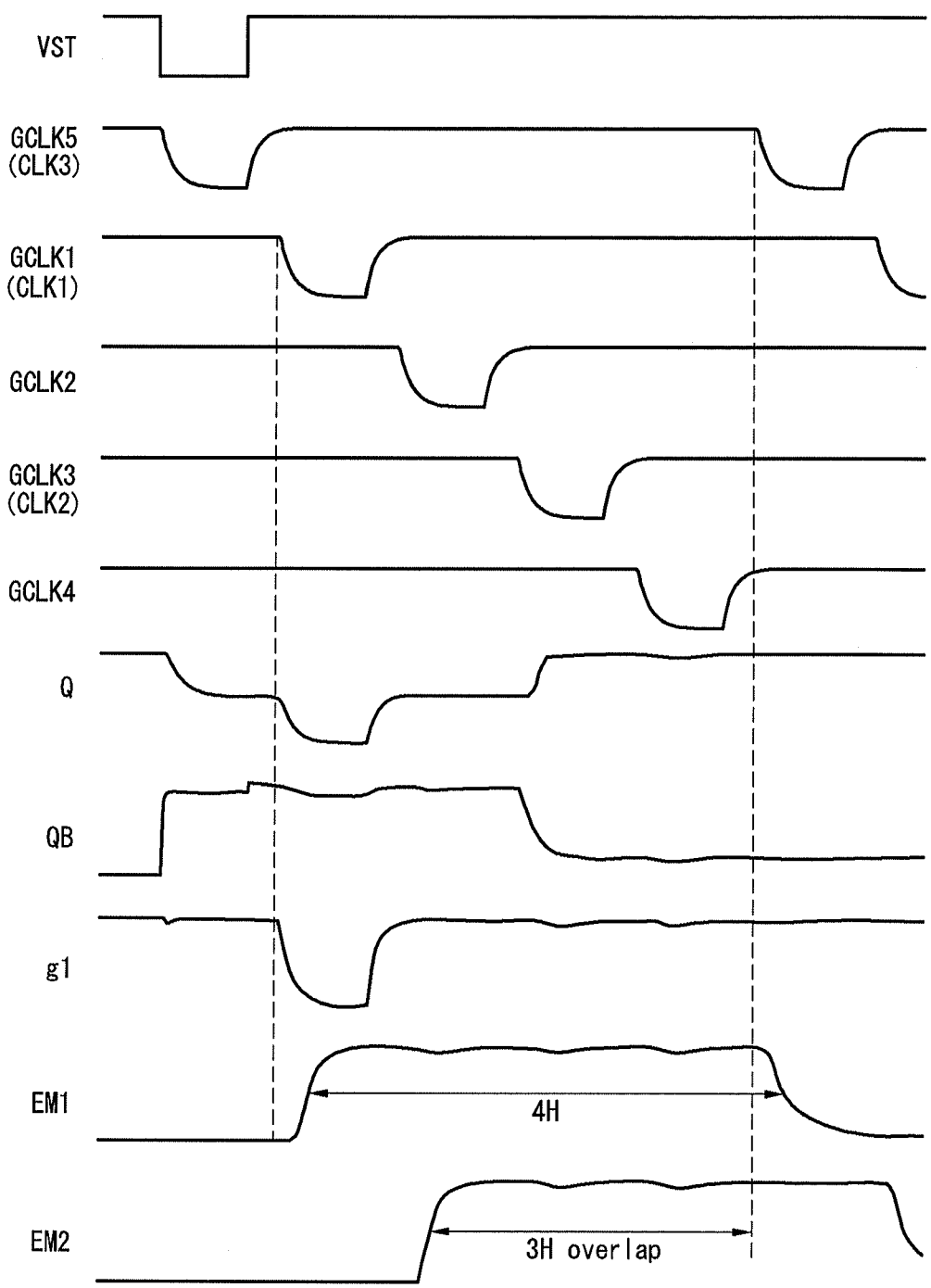
FIG. 9 is a waveform diagram illustrating operations of a first selection unit and a first buffer in a 2D mode.

Three clocks CLK1, CLK2, and CLK3 are input to each of the shift registers 11 to 1n. As shown in FIGS. 3 and 9, three clocks CLK1, CLK2, and CLK3 are selected from 5-phase gate clocks GCLK1, GCLK2, GCLK3, GCLK4, and GCLK5 which have a phase shifted by one horizontal period with each other and a level swinging between a turn-on level and a turn-off level. The first clock CLK1 can be a clock having a phase which is synchronized with the phase of the scan pulse of the corresponding shift register. The second clock CLK2 can be a clock which is delayed from the first clock CLK1 by about two horizontal periods, and the third clock CLK3 can be a clock which is delayed from the second clock CLK2 by about two horizontal periods. For example, as shown in FIGS. 3 and 9, in the clocks CLK1, CLK2, and CLK3 input to the first shift register 11, the first clock CLK1 corresponds to a first gate clock GCLK1, the second clock CLK2 corresponds to a third gate clock GCLK3, and the third clock CLK3 corresponds to a fifth gate clock GCLK5. In the same manner, in the second shift register 12, the first clock CLK1 corresponds to a second gate clock GCLK2, the second clock CLK2 corresponds to a fourth gate clock GCLK4, and the third clock CLK3 corresponds to the first clock GCLK1. In the same manner, in the nth shift register 1n, the first clock CLK1 corresponds to the fifth gate clock GCLK5, the second clock CLK2 corresponds to the second gate clock GCLK2, and the third clock CLK3 corresponds to the fourth clock GCLK4.

A first direct current (DC) driving voltage EVSS of the turn-on level and a second DC driving voltage EVDD of the turn-off level are input to each of the shift registers 11 to 1n. The first shift register 11 receives a start voltage VST to operate. Each of the second to nth shift registers 12 to 1n receives the scan pulse output from the preceding shift register as the start voltage to operate. As shown in FIG. 9, the start voltage VST input to the first shift register 11 is synchronized with the third clock CLK3, i.e., the fifth gate clock GCLK5.

The selection block 2 includes a plurality of selection units 21 to 2n. The first DC driving voltage EVSS of the turn-on level and the second DC driving voltage EVDD of the turn-off level are input to each of the selection units 21 to 2n. The selection units 21 to 2n are respectively connected to output terminals of the shift registers 11 to 1n and respectively receive the scan pulses g1 to gn from the shift registers 11 to 1n. The third clock CLK3 is input to each of the selection units 21 to 2n. As shown in FIG. 3, the third clock CLK3 input to the first selection unit 21 corresponds to the fifth gate clock GCLK5, the third clock CLK3 input to the second selection unit 22 corresponds to the first gate clock GCLK1, the third clock CLK3 input to the (n−1)th selection unit 2(n−1) corresponds to the third gate clock GCLK3, and the third clock CLK3 input to the nth selection unit 2n corresponds to the fourth gate clock GCLK4.

The selection units 21 to 2n commonly receive a selection signal SEL, a first common control signal SEB, and a second common control signal SE. The selection signal SEL of the turn-on level is input when a 2D image is implemented, and the selection signal SEL of the turn-off level is input when a 3D image is implemented. When the 2D image is implemented, the selection units 21 to 2n respectively apply the scan pulses g1 to gn to first output nodes NA of the selection units 21 to 2n in response to the selection signal SEL of the turn-on level, thereby sequentially setting the first output nodes NA at the turn-on level. Further, the selection units 21 to 2n respectively apply the third clock CLK3 to second output nodes NB of the selection units 21 to 2n, thereby sequentially setting the second output nodes NB at the turn-on level. When the 3D image is implemented, the selection units 21 to 2n simultaneously set the first output nodes NA at the turn-on level based on the first common control signal SEB in response to the selection signal SEL of the turn-off level. Further, the selection units 21 to 2n simultaneously set the second output nodes NB at the turn-on level based on the second common control signal SE in response to the selection signal SEL of the turn-off level.

The buffer block 3 includes a plurality of buffers 31 to 3n. The first DC driving voltage EVSS of the turn-on level and the second DC driving voltage EVDD of the turn-off level are input to each of the buffers 31 to 3n. The buffers 31 to 3n are respectively connected to the selection units 21 to 2n through the first and second output nodes NA and NB of the selection units 21 to 2n. Each of the buffers 31 to 3n generates an emission pulse of the turn-off level from immediately after the first output node NA is set at the turn-on level to immediately before the second output node NB is set at the turn-on level. Further, each of the buffers 31 to 3n generates the emission pulse of the turn-on level since immediately after the second output node NB is set at the turn-on level.

Figure 4:
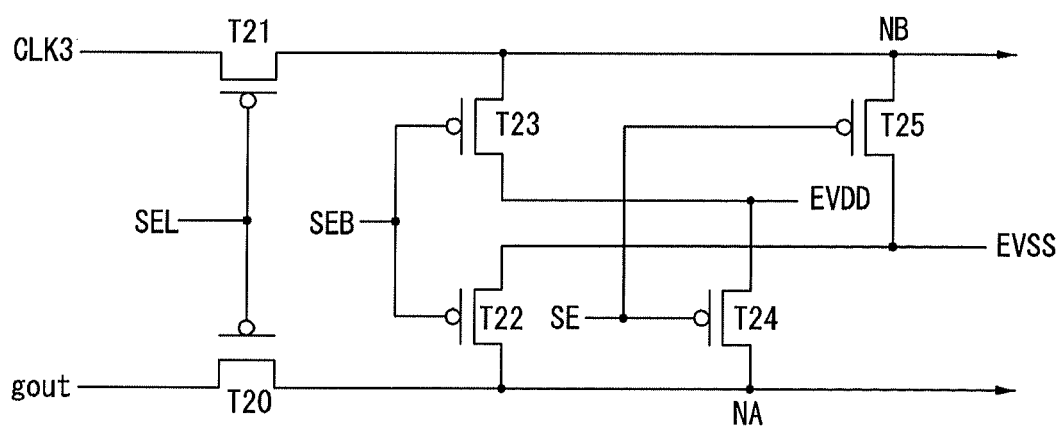
FIG. 4 illustrates one of a plurality of selection units included in a selection block.

FIG. 4 illustrates in detail one of the plurality of selection units 21 to 2n included in the selection block 2. In FIG. 4, 'gout' indicates one of the scan pulses g1 to gn.

As shown in FIG. 4, the selection unit includes a plurality of P-type thin film transistors (TFTs) T20 to T25.

The TFT T20 includes a gate electrode connected to an input terminal receiving the selection signal SEL, a source electrode connected to an input terminal receiving the scan pulse 'gout', and a drain electrode connected to the first output node NA. The TFT T20 establishes a current path between the input terminal receiving the scan pulse 'gout' and the first output node NA by turning on and cuts off the current path by turning off in response to the selection signal SEL.

The TFT T21 includes a gate electrode connected to the input terminal receiving the selection signal SEL, a source electrode connected to an input terminal receiving the third clock CLK3, and a drain electrode connected to the second output node NB. The TFT T21 establishes a current path between the input terminal receiving the third clock CLK3 and the second output node NB by turning on and cuts off the current path by turning off in response to the selection signal SEL.

The TFT T22 includes a gate electrode connected to an input terminal receiving the first common control signal SEB, a source electrode connected to the first output node NA, and a drain electrode connected to an input terminal receiving the first DC driving voltage EVSS. The TFT T22 establishes a current path between the first output node NA and the input terminal receiving the first DC driving voltage EVSS by turning on and cuts off the current path by turning off in response to the first common control signal SEB.

The TFT T23 includes a gate electrode connected to the input terminal receiving the first common control signal SEB, a source electrode connected to an input terminal receiving the second DC driving voltage EVDD, and a drain electrode connected to the second output node NB. The TFT T23 establishes a current path between the input terminal receiving the second DC driving voltage EVDD and the second output node NB by turning on and cuts off the current path by turning off in response to the first common control signal SEB.

The TFT T24 includes a gate electrode connected to the input terminal receiving the second common control signal SE, a source electrode connected to the input terminal receiving the second DC driving voltage EVDD, and a drain electrode connected to the first output node NA. The TFT T24 establishes a current path between the input terminal receiving the second DC driving voltage EVDD and the first output node NA by turning on and cuts off the current path by turning off in response to the second common control signal SE.

The TFT T25 includes a gate electrode connected to the input terminal receiving the second common control signal SE, a source electrode connected to the second output node NB, and a drain electrode connected to the input terminal receiving the first DC driving voltage EVSS. The TFT T25 establishes a current path between the second output node NB and the input terminal receiving the first DC driving voltage EVSS by turning on and cuts off the current path by turning off in response to the second common control signal SE.

Figure 6:
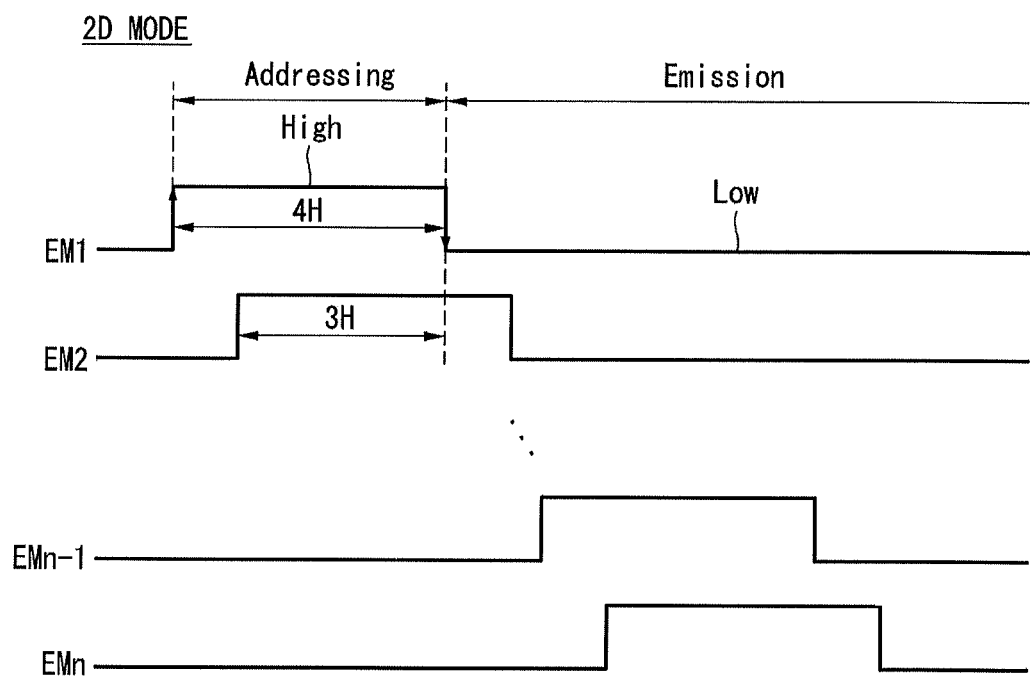
FIG. 6 illustrates emission pulses, which are sequentially generated in a 2D mode.
Figure 7:
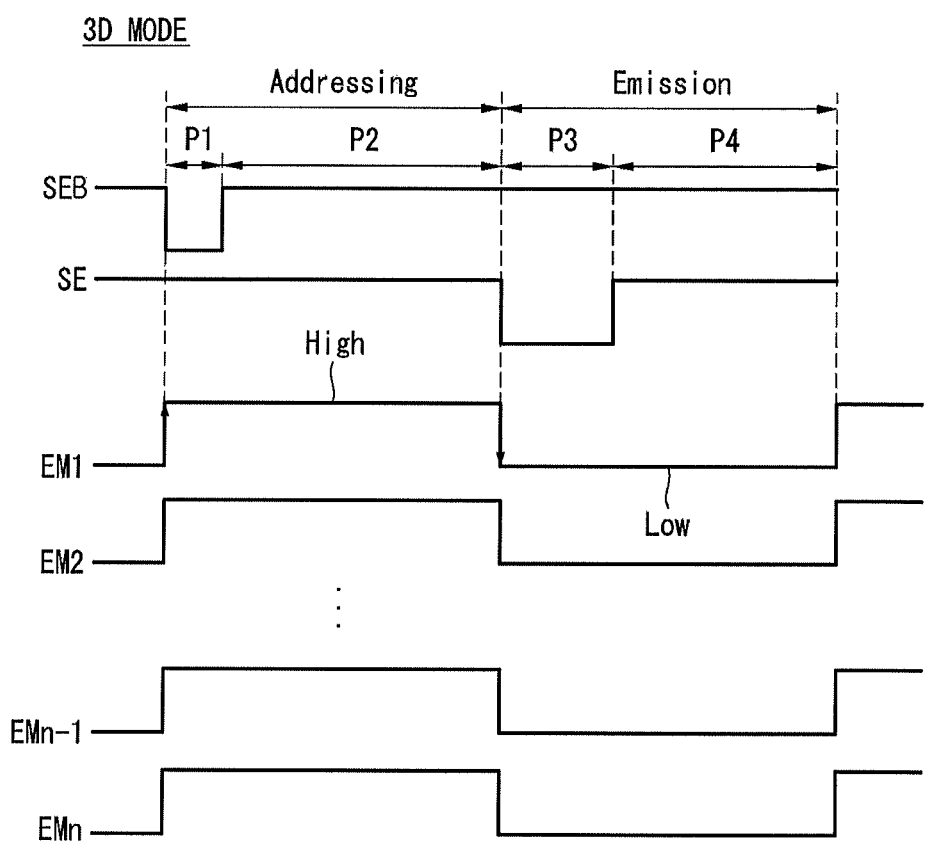
FIG. 7 illustrates emission pulses, which are simultaneously generated in a 3D mode.

An operation of the selection unit illustrated in FIG. 4 is described below by referring to FIGS. 5 to 7.

As shown in FIG. 5, in a 2D mode for implementing the 2D image, the selection signal SEL of the turn-on level 'Low' is input, and the first and second common control signals SEB and SE of the turn-off level 'High' are input. Further, the TFTs T20 and T21 are turned on, and the TFTs T22 to T25 are turned off.

The switching operations of the TFTs T20 to T25 allow the first output node NA to be set at the turn-on level by the scan pulse 'gout' and allow the second output node NB to be set at the turn-on level by the third clock CLK3. As a result, as shown in FIG. 6, emission pulses EM1 to EMn generated through the buffer block 3 rise to the turn-off level 'High' when the first output node NA is set at the turn-on level in response to the scan pulse 'gout', and then are held at the turn-off level 'High' until immediately before the second output node NB is set at the turn-on level in response to the third clock CLK3. The emission pulses EM1 to EMn fall to the turn-on level 'Low' when the second output node NB is set at the turn-on level 'low' in response to the third clock CLK3, and then are held at the turn-on level 'Low' for about one frame period. The third clock CLK3 is delayed by four horizontal periods 4 H from the scan pulse 'gout' synchronized with the first clock CLK1 and inputted, and thus, the emission pulses EM1 to EMn are maintained at the turn-off level 'High' for four horizontal periods 4 H. Both the scan pulse 'gout' and the third clock CLK3 are sequentially delayed by one horizontal period for each selection unit other than the first selection unit 21 and inputted to all the selection units 21 to 2n, and thus, the turn-off levels 'High' of the adjacent emission pulses overlap for three horizontal periods 3 H. A period, during which the emission pulse of the turn-off level 'High' is generated, corresponds to an addressing period of data, and a period, during which the emission pulse of the turn-on level 'Low' is generated, corresponds to a light emission period. As described above, in the 2D mode, the first output nodes NA of the selection block 2 are sequentially set at the turn-on level, and also the second output nodes NB of the selection block 2 are sequentially set at the turn-on level. Therefore, phases of the emission pulses EM1 to EMn generated through the buffer block 3 are sequentially shifted by one horizontal period, thereby realizing sequential light emission.

On the other hand, as shown in FIG. 5, in a 3D mode for implementing the 3D image, the selection signal SEL of the turn-off level 'High' is input. The first common control signal SEB of the turn-on level 'Low' is input in a first period P1 for setting the first output node NA at the turn-on level, and the first common control signal SEB of the turn-off level 'High' is input in a third period P3 for setting the second output node NB at the turn-on level, a second period P2 between the first period P1 and the third period P3, and a fourth period P4 following the third period P3. The second common control signal SE of the turn-on level 'Low' is input in the third period P3, and the second common control signal SE of the turn-off level 'High' is input in the first period P1, the second period P2, and the fourth period P4. In the 3D mode, the TFTs T20 and T21 are continuously turned off in the first to fourth periods P1 to P4. In the first period P1, the TFTs T22 and T23 are turned on and the TFTs T24 and T25 are turned off. In the third period P3, the TFTs T22 and T23 are turned off and the TFTs T24 and T25 are turned on. In the second and fourth periods P2 and P4, all of the TFTs T22 to T25 are turned off.

The switching operations of the TFTs T20 to T25 allow the first output node NA to be set at the turn-on level by the first common control signal SEB in the first period P1 and the second output node NB to be set at the turn-on level by the second common control signal SE in the third period P3. As a result, as shown in FIG. 7, the emission pulses EM1 to EMn generated through the buffer block 3 rise to the turn-off level 'High' when the first output node NA is set in response to the first common control signal SEB, and then are held at the turn-off level 'High' to immediately before the second output node NB is set in response to the second common control signal SE. The emission pulses EM1 to EMn fall to the turn-on level 'Low' when the second output node NB is set in response to the second common control signal SE, and then are held at the turn-on level 'Low' during about one frame period. Because the first and second common control signals SEB and SE are simultaneously input to all of the selection units 21 to 2n, the emission pulses EMI to EMn alternatively represents the turn-off level 'High' and the turn-on level 'Low' at intervals of about one frame. The first and second periods P1 and P2, during which the emission pulse of the turn-off level 'High' is generated, correspond to a period during which left eye image data or right eye image data are sequentially addressed to pixels. Further, the third and fourth periods P3 and P4, during which the emission pulse of the turn-on level 'Low' is generated, correspond to a period during which the pixels simultaneously emit light using the left eye image data or the right eye image data, whose the addressing has been completed. As described above, in the 3D mode, because the first output nodes NA of the selection block 2 are simultaneously set at turn-on level, and also the second output nodes NB of the selection block 2 are simultaneously set at turn-on level. Therefore, the emission pulses EM1 to EMn generated through the buffers 31 to 3n implement the simultaneous light emission without the phase delay.

Figure 8:
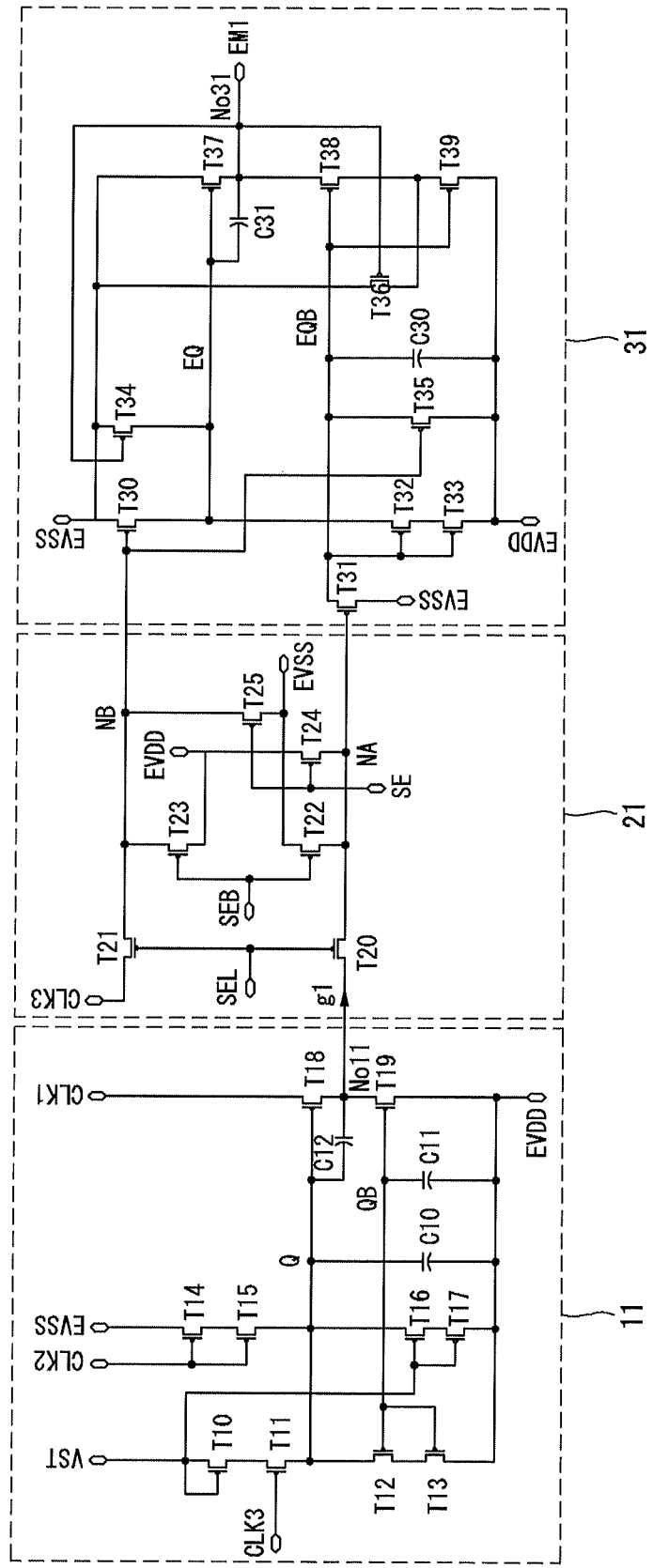
FIG. 8 illustrates a first shift register, a first selection unit, and a first buffer, which are cascade-connected to one another.

FIG. 8 is a circuit diagram of each of the first shift register 11, the first selection unit 21, and the first buffer 31, which are cascade-connected to one another.

The first shift register 11 includes a plurality of P-type TFTs T10 to T19 and a plurality of capacitors C10 to C12.

The TFT T10 includes a gate electrode and a drain electrode, each of which is diode-connected to an input terminal of the start voltage VST, and a source electrode connected to a drain electrode of the TFT T11. The TFT T11 includes a gate electrode connected to the input terminal of the third clock CLK3, a source electrode connected to a Q-node, and the drain electrode connected to the source electrode of the TFT T10. The TFT T12 includes a gate electrode connected to a QB-node, a source electrode connected to a drain electrode of the TFT T13, and a drain electrode connected to the Q-node. The TFT T13 includes a gate electrode connected to the QB-node, a source electrode connected to the input terminal of the second DC driving voltage EVDD, and the drain electrode connected to the source electrode of the TFT T12. The TFT T14 includes a gate electrode connected to an input terminal of the second clock CLK2, a source electrode connected to a drain electrode of the TFT T15, and a drain electrode connected to the input terminal of the first DC driving voltage EVSS. The TFT T15 includes a gate electrode connected to the input terminal of the second clock CLK2, a source electrode connected to the QB node, and a drain electrode connected to the source electrode of the TFT T14. The TFT T16 includes a gate electrode connected to the input terminal of the start voltage VST, a source electrode connected to a drain electrode of the TFT T17, and a drain electrode connected to the QB node. The TFT T17 includes a gate electrode connected to the input terminal of the start voltage VST, a source electrode connected to the input terminal of the second DC driving voltage EVDD, and a drain electrode connected to the source electrode of the TFT T16. The TFT T18 includes a gate electrode connected to the Q-node, a source electrode connected to an output terminal No11 of the first shift register 11, and a drain electrode connected to an input terminal of the first clock CLK1. The TFT T19 includes a gate electrode connected to the QB node, a source electrode connected to the input terminal of the second DC driving voltage EVDD, and a drain electrode connected to the output terminal No11. The capacitor C10 is connected between the Q-node and the input terminal of the second DC driving voltage EVDD. The capacitor C11 is connected between the QB-node and the input terminal of the second DC driving voltage EVDD. The capacitor C12 is connected between the Q-node and the output terminal No11.

An operation of the first shift register 11 is described below with reference to FIG. 9.

When the start voltage VST and the third clock CLK3, which are synchronized with each other, are input to the first shift register 11, the TFTs T10 and T11 are turned on to thereby discharge the Q-node at a middle level. Further, the TFTs T16 and T17 are turned on to thereby charge the QB-node to the second DC driving voltage EVDD of the turn-off level. Subsequently, when the first clock CLK1, which is retarded from the start voltage VST by one horizontal period, is input to the first shift register 11, a voltage of the Q-node is boosted to thereby lower form the middle level to the first DC driving voltage EVSS of the turn-on level. Hence, the TFT T18 is turned on and applies the first clock CLK1 as the first scan pulse g1 to the output terminal No11. The voltage of the Q-node again rises to the middle level at a time when the input of the first clock CLK1 has been completed. Subsequently, when the second clock CLK2, which is retarded from the first clock CLK1 by two horizontal periods, is input to the first shift register 11, the TFTs T14 and T15 are turned on to thereby discharge the QB-node to the first DC driving voltage EVSS of the turn-on level. Hence, the TFT T19 is turned on and applies the second DC driving voltage EVDD of the turn-off level as the first scan pulse g1 to the output terminal No11. When the QB-node is discharged to the first DC driving voltage EVSS of the turn-on level, the TFTs T12 and T13 are turned on to thereby charge the Q-node to the second DC driving voltage EVDD of the turn-off level. Hence, the voltage of the Q-node rises from the middle level to the second DC driving voltage EVDD of the turn-off level. The capacitors C10 to C12 stabilize an output waveform of the first scan pulse g1 applied to the output terminal No11.

Since configuration of the first selection unit 21 shown in FIG. 8 is substantially the same as configuration of the selection unit shown in FIG. 4, a further description may be briefly made or may be entirely omitted.

The first buffer 31 includes a plurality of P-type TFTs T30 to T39 and a plurality of capacitors C30 and C31.

The TFT T30 includes a gate electrode connected to the second output node NB of the first selection unit 21, a source electrode connected to an EQ node, and a drain electrode connected to the input terminal of the first DC driving voltage EVSS. The TFT T31 includes a gate electrode connected to the first output node NA of the first selection unit 21, a source electrode connected to an EQB node, and a drain electrode connected to the input terminal of the first DC driving voltage EVSS. The TFT T32 includes a gate electrode connected to the EQB node, a source electrode connected to a drain electrode of the TFT T33, and a drain electrode connected to the EQ node. The TFT T33 includes a gate electrode connected to the EQB node, a source electrode connected to the input terminal of the second DC driving voltage EVDD, and the drain electrode connected to the source electrode of the TFT T32. The TFT T34 includes a gate electrode connected to an output terminal No31 of the first buffer 31, a source electrode connected to the EQ node, and a drain electrode connected to the input terminal of the first DC driving voltage EVSS. The TFT T35 includes a gate electrode connected to the second output node NB of the first selection unit 21, a source electrode connected to the input terminal of the second DC driving voltage EVDD, and a drain electrode connected to the EQB node. The TFT T36 includes a gate electrode connected to the output terminal No31, a source electrode commonly connected to the TFTs T38 and T39, and a drain electrode connected to the input terminal of the first DC driving voltage EVSS. The TFT T37 includes a gate electrode connected to the EQ node, a source electrode connected to the output terminal No31, and a drain electrode connected to the input terminal of the first DC driving voltage EVSS. The TFT T38 includes a gate electrode connected to the EQB node, a source electrode connected to the source electrode of the TFT T36, and a drain electrode connected to the output terminal No31. The TFT T39 includes a gate electrode connected to the EQB node, a source electrode connected to the input terminal of the second DC driving voltage EVDD, and a drain electrode connected to the source electrode of the TFT T36. The capacitor C30 is connected between the input terminal of the second DC driving voltage EVDD and the EQB node. The capacitor C31 is connected between the EQ node and the output terminal No31.

Figure 10:
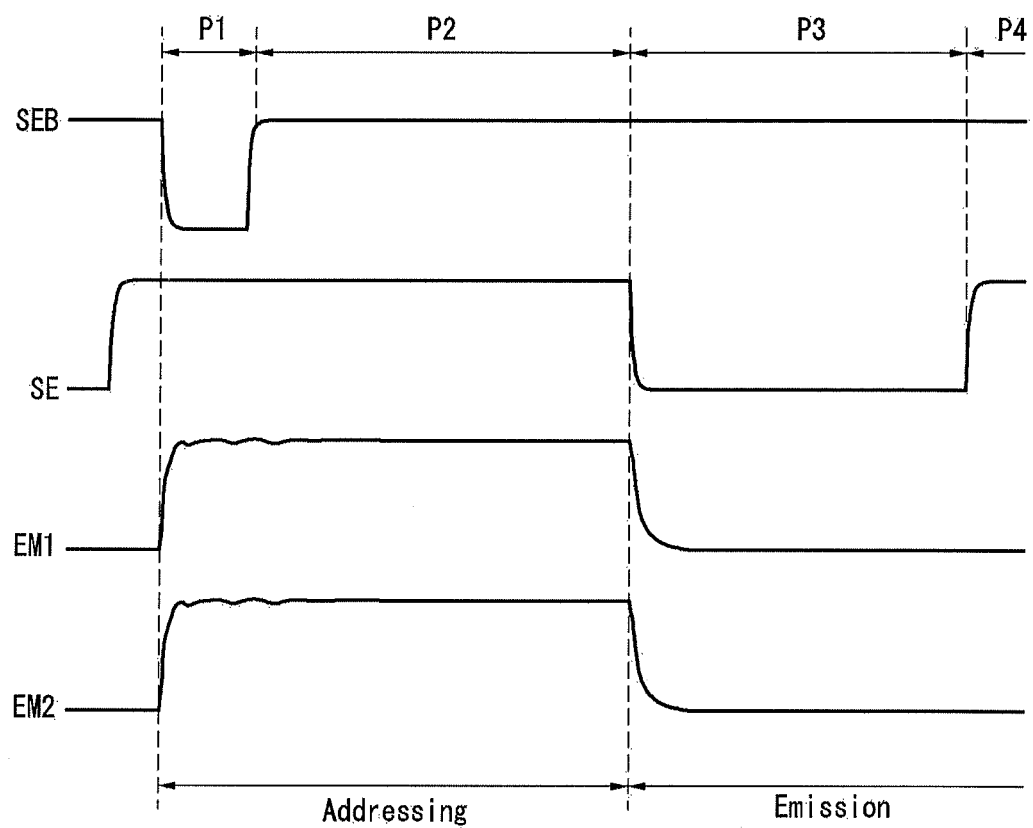
FIG. 10 is a waveform diagram illustrating operations of a first selection unit and a first buffer in a 3D mode.

An operation of the first buffer 31 is described below with reference to FIGS. 9 and 10.

An operation of the first buffer 31 in the 2D mode is described below with reference to FIG. 9.

When the first output node NA of the first selection unit 21 is set at the turn-on level by the first scan pulse g1 synchronized with the first clock CLK1, the TFT T31 is turned on to thereby discharge the EQB node to the first DC driving voltage EVSS of the turn-on level. Hence, the TFTs T38 and T39 are turned on and apply the second DC driving voltage EVDD of the turn-off level to the output terminal No31. As a result, the first emission pulse EM1 rises. In this instance, the TFTs T32 and T33 are turned on to thereby charge the EQ node to the second DC driving voltage EVDD of the turn-off level. Hence, the TFT T37 is turned off. The first emission pulse EM1 is held to the second DC driving voltage EVDD of the turn-off level until the second output node NB of the first selection unit 21 is set at the turn-on level.

Subsequently, when the second output node NB of the first selection unit 21 is set at the turn-on level by the third clock CLK3, which is retarded from the first clock CLK1 by four horizontal periods 4 H, the TFT T30 is turned on to thereby discharge the EQ node to the first DC driving voltage EVSS of the turn-on level. Hence, the TFT T37 is turned on and applies the first DC driving voltage EVSS of the turn-on level to the output terminal No31. As a result, the first emission pulse EM1 falls. In this instance, the TFT T35 is turned on to thereby charge the EQB node to the second DC driving voltage EVDD of the turn-off level. Hence, the TFTs T38 and T39 are turned off. The TFT T34 is turned on at a time when the voltage of the output terminal No31 falls to the turn-on level, and thus holds the first emission pulse EM1 to the first DC driving voltage EVSS of the turn-on level during about one frame. The TFT T36 is turned on at a time when the voltage of the output terminal No31 falls to the turn-on level, and thus applies the first DC driving voltage EVSS of the turn-on level between the TFTs T38 and T39. The capacitors C30 and C31 stabilize an output waveform of the first emission pulse EM1 applied to the output terminal No31. The second emission pulse EM2 shown in FIG. 9 is a signal generated in the second buffer 32 disposed under the first buffer 31 and is retarded from the first emission pulse EM1 by one horizontal period.

An operation of the first buffer 31 in the 3D mode is described below with reference to FIG. 10.

When the first output node NA is set at the turn-on level by the first common control signal SEB in the first period P1, the TFT T31 is turned on to thereby discharge the EQB node to the first DC driving voltage EVSS of the turn-on level. Hence, the TFTs T38 and T39 are turned on and apply the second DC driving voltage EVDD of the turn-off level to the output terminal No31. As a result, the first emission pulse EM1 rises. In this instance, the TFTs T32 and T33 are turned on to thereby charge the EQ node to the second DC driving voltage EVDD of the turn-off level. Hence, the TFT T37 is turned off. The first emission pulse EM1 is held to the second DC driving voltage EVDD of the turn-off level during the second period P2.

Subsequently, when the second output node NB is set at the turn-on level by the second common control signal SE in the third period P3, the TFT T30 is turned on to thereby discharge the EQ node to the first DC driving voltage EVSS of the turn-on level. Hence, the TFT T37 is turned on and applies the first DC driving voltage EVSS of the turn-on level to the output terminal No31. As a result, the first emission pulse EM1 falls. In this instance, the TFT T35 is turned on to thereby charge the EQB node to the second DC driving voltage EVDD of the turn-off level. Hence, the TFTs T38 and T39 are turned off. The TFT T34 is turned on at a time when the voltage of the output terminal No31 rises to the turn-on level, and thus holds the first emission pulse EM1 to the first DC driving voltage EVSS of the turn-on level even in the fourth period P4. The TFT T36 is turned on at a time when the voltage of the output terminal No31 rises to the turn-on level, and thus applies the first DC driving voltage EVSS of the turn-on level between the TFTs T38 and T39. The capacitors C30 and C31 stabilize an output waveform of the first emission pulse EM1 applied to the output terminal No31. The second emission pulse EM2 shown in FIG. 10 is a signal generated by the second buffer 32 disposed under the first buffer 31 and is generated simultaneously with the first emission pulse EM1.

Figure 11:
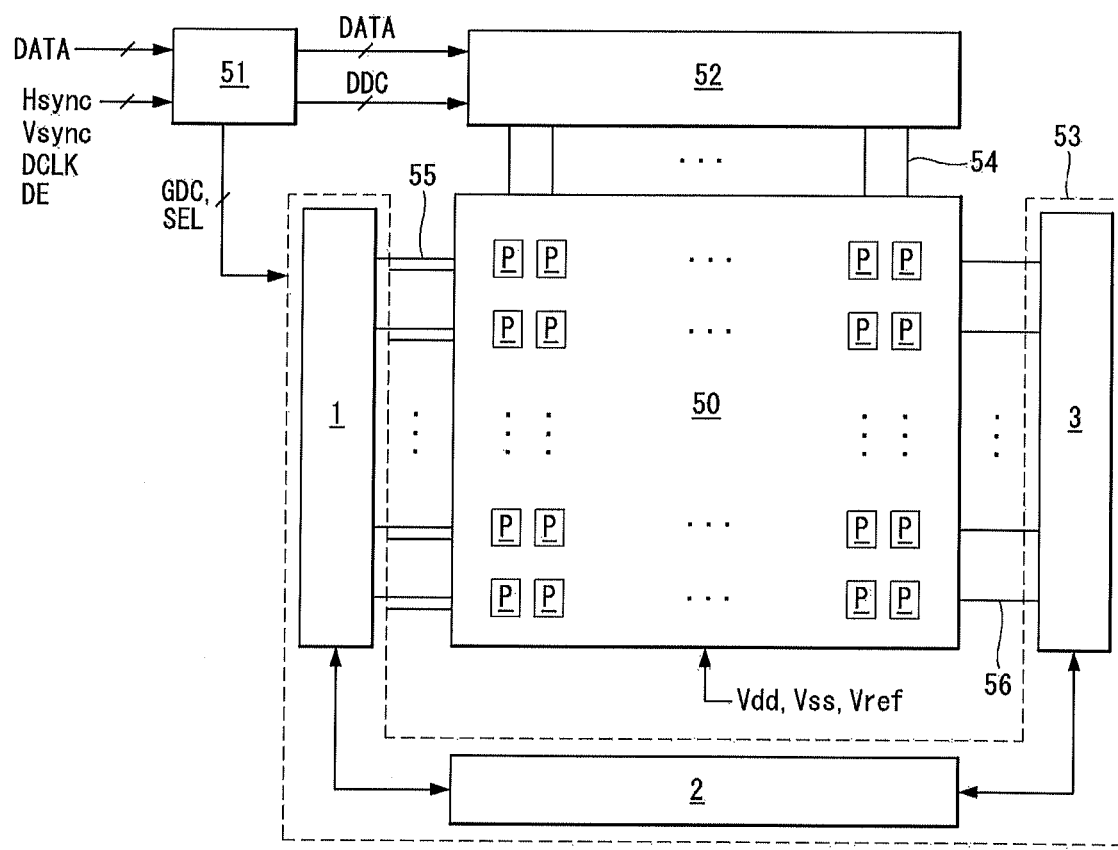
FIGS. 11 and 12 are block diagrams of an organic light emitting diode (OLED) display according to an example embodiment of the invention.
Figure 12:
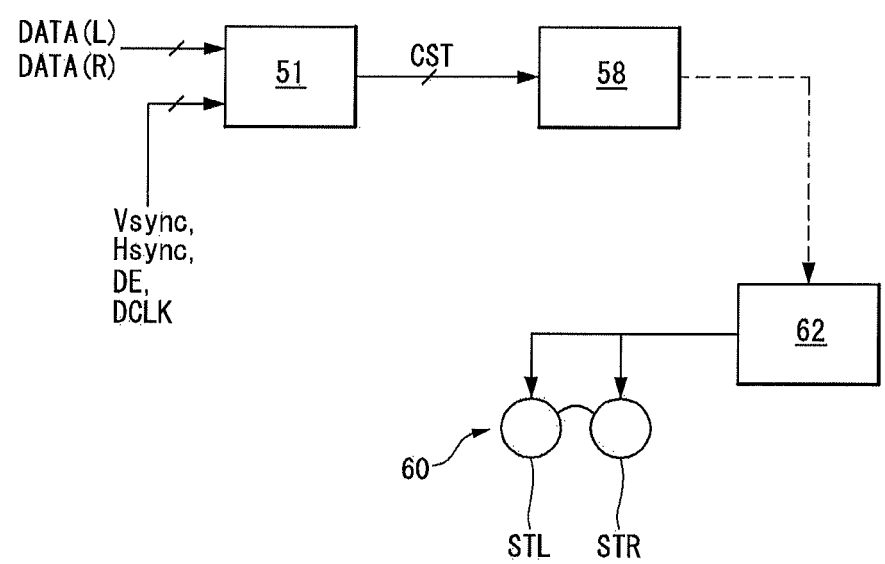
Figure 13:
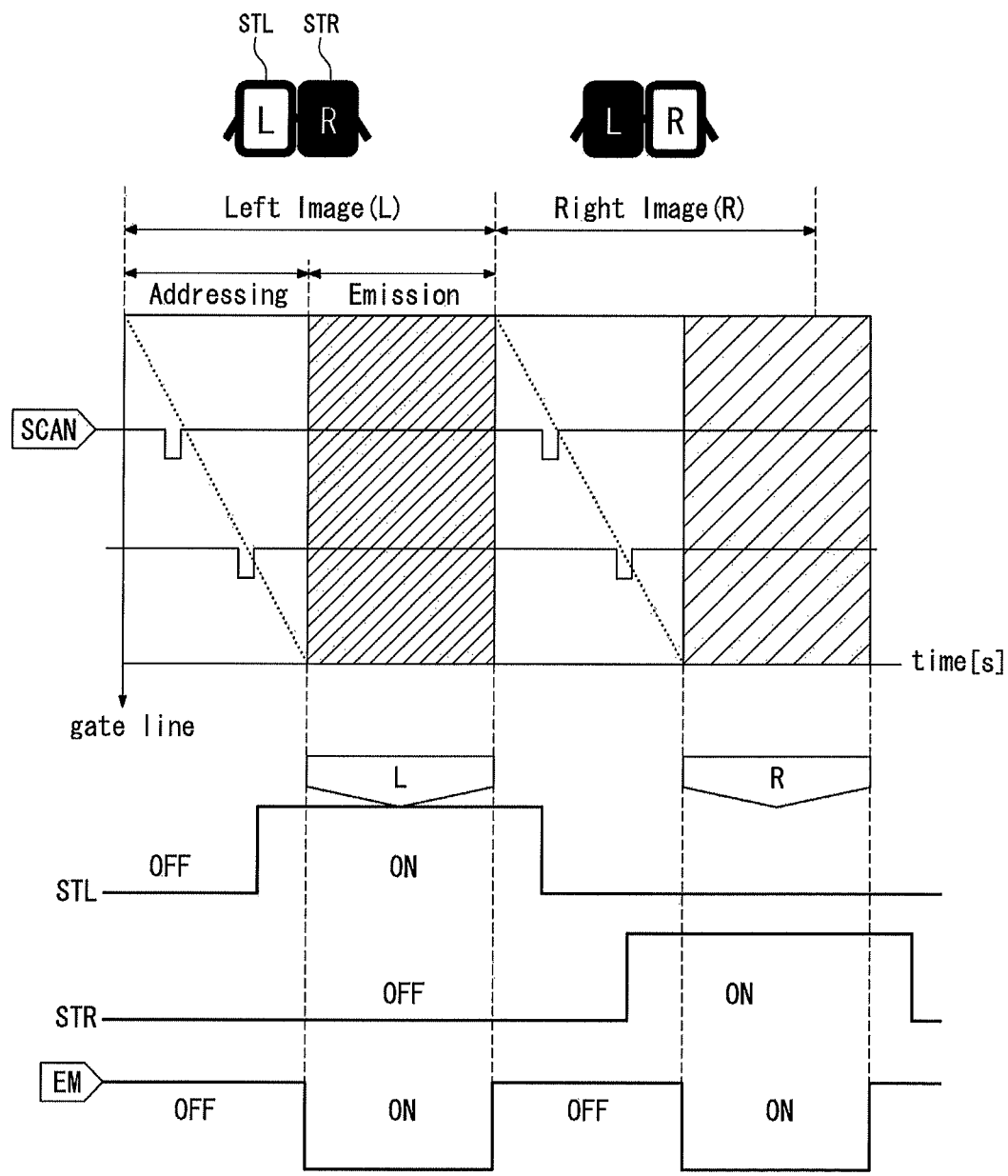
FIG. 13 illustrates an example of illustrating a 3D image through an OLED display according to an example embodiment of the invention.

FIGS. 11 to 13 illustrate an organic light emitting diode (OLED) display according to the exemplary embodiment of the invention.

As shown in FIGS. 11 and 12, the OLED display according to the exemplary embodiment of the invention includes a display panel 50 on which pixels P are arranged in a matrix form, a data driver 52 for driving data lines 54, a gate driver 53 for driving gate lines 55 and 56, and a control circuit 51 for controlling operations of the drivers 52 and 53. The OLED display further includes liquid crystal shutter glasses 60 for implementing the 3D image.

The plurality of data lines 54 and the plurality of gate lines 55 and 56 are positioned to cross each other on the display panel 50. The pixels P are arranged at crossings between the data lines 54 and the gate lines 55 and 56, respectively. The gate lines 55 and 56 include a plurality of scan lines 55 and a plurality of emission lines 56. A first driving voltage Vdd, a second driving voltage Vsss, and a third driving voltage Vref are supplied to each of the pixels P. Each of the pixels P may include an organic light emitting which emits light by a driving current flowing through it, a driving TFT for controlling the driving current based on a voltage between a source electrode and a gate electrode of the driving TFT, at least one switch TFT connected to the scan lines 55, an emission TFT connected to the emission lines 56, and at least one storage capacitor The control circuit 51 rearranges digital video data DATA received from the outside in conformity with a resolution of the display panel 50 and supplies the rearranged digital video data DATA to the data driver 52. The control circuit 51 generates a data control signal DDC for controlling operation timing of the data driver 52 and a gate control signal GDC for controlling operation timing of the gate driver 53 based on timing signals, such as a vertical sync signal Vsync, a horizontal sync signal Hsync, a data enable DE, and a dot clock DCLK. The gate control signal GDC includes gate start voltage VST, and gate clocks GCLK1, GCLK2, GCLK3, GCLK4, and GCLK5.

In the 3D mode, the control circuit 51 separates the digital video data DATA into left eye data L for implementing the left eye image and right eye data R for implementing the right eye image and then supplies the left eye data L and the right eye data R to the data driver 52. In the 3D mode, the control circuit 51 generates a shutter control signal CST for controlling left and right eye shutters STL and STR of the liquid crystal shutter glasses 60. In the 3D mode, the control circuit 51 multiplies an input frame frequency by N to obtain a frame frequency of (input frame frequency×N), where N is a positive integer equal to or greater than 2. The control circuit 51 may generate the control signals DDC, GDC, and CST based on the frame frequency of (input frame frequency×N). The input frame frequency is 50 Hz in a phase alternate line (PAL) scheme and 60 Hz in a national television standards committee (NTSC) scheme. The control circuit 51 generates the selection signal SEL of the turn-on level in the 2D mode and generates the selection signal SEL of the turn-off level in the 3D mode.

The data driver 52 converts the digital video data DATA received from the control circuit 51 into an analog data voltage (hereinafter, referred to as 'data voltage') in response to the data control signal DDC and supplies the data voltage to the data lines 54.

The gate driver 53 includes the shift register block 1, the selection block 2, and the buffer block 3 as described above with reference to FIGS. 2 to 10. The shift register block 1 generates the scan pulse based on the gate control signal GDC and supplies the scan pulse to the scan lines 55. The selection block 2 controls the operation of the buffer block 3 based on the selection signal SEL. The buffer block 3 generates the emission pulse based on the output of the selection block 2 and supplies the emission pulse to the emission lines 56. The gate driver 53 is formed in a non-display area of the display panel 50 through the same process as the TFTs of the pixels P based on a gate-in-panel (GIP) method.

The liquid crystal shutter glasses 60 include the left eye shutter STL and the right eye shutter STR which are separately controlled electrically. Each of the left eye shutter STL and the right eye shutter STR includes a first transparent substrate, a first transparent electrode formed on the first transparent substrate, a second transparent substrate, a second transparent electrode formed on the second transparent substrate, and a liquid crystal layer interposed between the first and second transparent substrates. A reference voltage is supplied to the first transparent electrode, and an ON or OFF voltage is supplied to the second transparent electrode. When the ON voltage is supplied to the second transparent electrode in response to the shutter control signal CST, each of the left and right eye shutters STL and STR transmits light from the display panel 50. On the other hand, when the OFF voltage is supplied to the second transparent electrode in response to the shutter control signal CST, each of the left and right eye shutters STL and STR blocks the light from the display panel 50.

A shutter control signal transmission unit 58 is connected to the control circuit 51 and transmits the shutter control signal CST received from the control circuit 51 to a shutter control signal receiving unit 62 via a wired/wireless interface. The shutter control signal receiving unit 62 is installed in the liquid crystal shutter glasses 60 and receives the shutter control signal CST via the wired/wireless interface. The shutter control signal receiving unit 62 alternately opens and closes the left eye shutter STL and the right eye shutter STR of the liquid crystal shutter glasses 60 in response to the shutter control signal CST. When the shutter control signal CST of a first logic value is input to the shutter control signal receiving unit 62 (i.e., when the left eye image is displayed), the ON voltage is supplied to the second transparent electrode of the left eye shutter STL and the OFF voltage is supplied to the second transparent electrode of the right eye shutter STR. When the shutter control signal CST of a second logic value is input to the shutter control signal receiving unit 62 (i.e., when the right eye image is displayed), the OFF voltage is supplied to the second transparent electrode of the left eye shutter STL and the ON voltage is supplied to the second transparent electrode of the right eye shutter STR. Accordingly, the left eye shutter STL of the liquid crystal shutter glasses 60 is open during a period in which the left eye image is displayed, and the right eye shutter STR of the liquid crystal shutter glasses 60 is open during a period in which the right eye image is displayed.

FIG. 13 illustrates an example of illustrating the 3D image through the OLED display according to the example embodiment of the invention.

As shown in FIG. 13, the OLED display according to the embodiment of the invention sequentially drives the scan lines through the gate driver and charges all of the pixels to the data voltages during an addressing period of the left eye image. Next, during a light emission period of the left eye image, the OLED display simultaneously drives the emission lines through the gate driver and allows the pixels to simultaneously emit light. The OLED display opens the left eye shutter STL of the liquid crystal shutter glasses and receives the left eye image incident from the pixels during the light emission period of the left eye image. The right eye shutter STR of the liquid crystal shutter glasses is closed during the display period of the left eye image.

Further, the OLED display according to the embodiment of the invention sequentially drives the scan lines through the gate driver and charges all of the pixels to the data voltages during an addressing period of the right eye image. Next, during a light emission period of the right eye image, the OLED display simultaneously drives the emission lines through the gate driver and allows the pixels to simultaneously emit light. The OLED display opens the right eye shutter STR of the liquid crystal shutter glasses and receives the right eye image incident from the pixels during the light emission period of the right eye image. The left eye shutter STL of the liquid crystal shutter glasses is closed during the display period of the right eye image.

Figure 1:
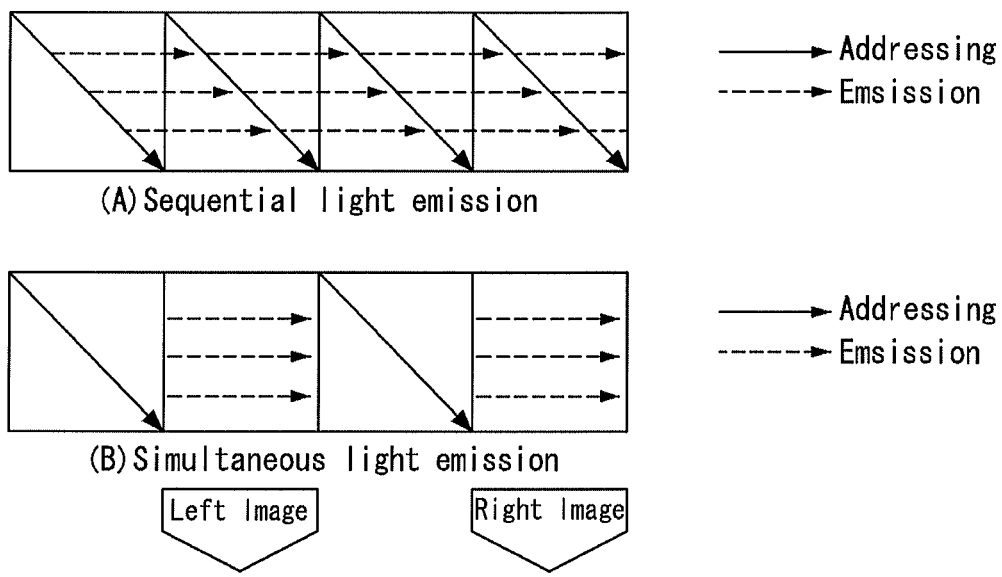
FIG. 1 illustrates a sequential light emission for implementing a 2D image and a simultaneous light emission for implementing a 3D image.

In the 2D mode, the OLED display according to the embodiment of the invention implements the sequential addressing operation and the sequential light emission through the gate driver as shown in (A) of FIG. 1.

As described above, the gate driver and the OLED display including the gate driver according to the embodiment of the invention add the selection block between the shift register block and the buffer block, thereby selectively implementing the sequential light emission and the simultaneous light emission. In other words, the gate driver and the OLED display including the gate driver according to the embodiment of the invention implement the sequential addressing operation and the sequential light emission in the 2D mode and implement the simultaneous light emission in the 3D mode after the sequential addressing operation has been completed.

Furthermore, because the gate driver and the OLED display including the gate driver according to the embodiment of the invention may generate the emission pulse using separately external control signals in the 3D mode, it is very easy to control the emission pulse.

In the embodiment of the invention, the TFTs of the gate driver contain p-type silicon. Other materials may be used for the TFTs of the gate driver. For example, amorphous silicon or silicon oxide may be used.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A gate driver comprising:
   a shift register block including a plurality of cascade-connected shift registers, each of the plurality of shift registers configured to sequentially output a scan pulse, whose phase is shifted by one horizontal period, in response to a start voltage, a first clock, a second clock, and a third clock;
   a selection block including a plurality of selection units, the selection units respectively connected to the plurality of shift registers, wherein the plurality of selection units are configured to receive the scan pulse and the third clock as input, and each selection unit from the plurality of selection units is configured to:
      apply the scan pulse to first output nodes of the selection unit in response to a selection signal representative of a 2D mode, to sequentially set the first output nodes of the selection units at a turn-on level,
      apply the third clock to second output nodes of the selection unit in response to the selection signal of the 2D mode, to sequentially set the second output nodes of the selection units at the turn-on level,
      simultaneously set the first output nodes at the turn-on level based on a first common control signal in response to the selection signal representative of a 3D mode, and
      simultaneously set the second output nodes at the turn-on level based on a second common control signal in response to the selection signal representative of the 3D mode; and
   a buffer block including a plurality of buffers, the buffers respectively connected to the plurality of selection units, wherein the buffer block is configured to generate emission pulses for a sequential light emission in the 2D mode and a simultaneous light emission in the 3D mode by:
      generation of an emission pulse of a turn-off level since immediately after the first output node is set at the turn-on level to immediately before the second output node is set at the turn-on level, and
      generation of the emission pulse of the turn-on level immediately after the second output node is set at the turn-on level.

2. The gate driver as claimed in claim 1, wherein the first clock, the second clock and the third clock are selected from among 5-phase gate clocks and are delayed by a predetermined time with respect to each other, the first clock has a phase which is synchronized with the phase of the scan pulse of a shift register, the second clock is delayed from the first clock by two horizontal periods, and the third clock is delayed from the second clock by two horizontal periods.

3. The gate driver as claimed in claim 1, the selection signal is used to select the 2D mode or the 3D mode for an organic light emitting diode (OLED) display comprising the gate driver, the selection signal is input at the turn-on level in the 2D mode, and the selection signal is input at the turn-off level in the 3D mode.

4. An organic light emitting diode (OLED) display comprising:
   a display panel including a plurality of pixels connected to a plurality of scan lines and a plurality of emission lines; and
   a gate driver configured to supply a scan pulse to the plurality of scan lines and supply an emission pulse to the plurality of emission lines, the gate driver including:
   a shift register block including a plurality of cascade-connected shift registers, each of the plurality of shift registers configured to output the scan pulse, whose a phase is shifted by one horizontal period, in response to a start voltage, a first clock, a second clock, and a third clock;
   a selection block including a plurality of selection units, the selection units respectively connected to the plurality of shift registers, and the plurality of selection units configured to receive the scan pulse and the third clock as input, wherein each of the plurality of selection units is configured to:
      sequentially set first output nodes and second output nodes of the selection units at a turn-on level in response to a selection signal representative of a 2D mode by application of the scan pulse to the first output nodes of the selection unit, and application of the third clock to the second output nodes of the selection unit, and
      simultaneously set the first output nodes and the second output nodes at the turn-on level in response to the selection signal representative of a 3D mode based on a first common control signal and a second common control signal; and
   a buffer block including a plurality of buffers, the buffers respectively connected to the plurality of selection units, the buffer block is configured to generate emission pulses for a sequential light emission in the 2D mode and a simultaneous light emission in the 3D mode, wherein each of the plurality of buffers is configured to:
      generate an emission pulse of a turn-off level since immediately after the first output node is set at the turn-on level to immediately before the second output node is set at the turn-on level, and
      generate the emission pulse of the turn-on level from immediately after the second output node is set at the turn-on level.

5. The gate driver as claimed in claim 4, wherein the first clock, the second clock and the third clock are selected from among 5-phase gate clocks and are delayed by a predetermined time with respect to each other, wherein the first clock has a phase which is synchronized with the phase of the scan pulse of a shift register, the second clock is delayed from the first clock by two horizontal periods, and the third clock is delayed from the second clock by two horizontal periods.

6. The gate driver as claimed in claim 4, the selection signal is used to select the 2D mode or the 3D mode for the organic light emitting diode (OLED) display comprising the gate driver, the selection signal is input at the turn-on level in the 2D mode, and the selection signal is input at the turn-off level in the 3D mode.

7. The gate driver of claim 6, wherein the first common control signal of the turn-off level and the second common control signal of the turn-off level are input in the 2D mode; and in the 3D mode, the first common control signal of the turn-on level is input in a first period for setting the first output node, and the first common control signal of the turn-off level is input in a third period for setting the second output node, a second period between the first period and the third period, and a fourth period following the third period, and in the 3D mode, the second common control signal of the turn-on level is input in the third period, and the second common control signal of the turn-off level is input in the first period, the second period, and the fourth period.

8. The gate driver of claim 7, wherein the emission pulse of the turn-off level is generated in the first and second periods, and the emission pulse of the turn-on level is generated in the third and fourth periods.

9. The gate driver as claimed in claim 7, wherein each of the selection units comprises:

a first TFT, the first TFT establishes a current path between an input terminal receiving the scan pulse and the first output node in response to the selection signal, a second TFT, the second TFT establishes a current path between an input terminal receiving the third clock and the second output node in response to the selection signal, a third TFT, the third TFT establishes a current path between the first output node and an input terminal receiving a first DC driving voltage (EVSS) in response to the first common control signal (SEB), a fourth TFT, the fourth TFT establishes a current path between an input terminal receiving a second DC driving voltage (EVDD) and the second output node in response to the first common control signal (SEB), a fifth TFT, the fifth TFT establishes a current path between the input terminal receiving the second DC driving voltage (EVDD) and the first output node in response to the second common control signal, and a sixth TFT, the sixth TFT establishes a current path between the second output node and the input terminal receiving the first DC driving voltage (EVSS) in response to the second common control signal.

10. The OLED display of claim 7, wherein the first and second periods correspond to a period during which left eye image data or right eye image data for implementing a 3D image is sequentially addressed to the pixels, wherein the third and fourth periods correspond to a period during which the pixels simultaneously emit light using left eye image data or right eye image data, whose addressing has been completed.

11. The OLED display of claim 4, wherein the gate driver is formed in a non-display area of the display panel.

12. The gate driver of claim 3, wherein, in the 2D mode, the first common control signal of the turn-off level and the second common control signal of the turn-off level are input; and in the 3D mode:

the first common control signal of the turn-on level is input in a first period for setting the first output node, and the first common control signal of the turn-off level is input in a third period for setting the second output node, a second period between the first period and the third period, and a fourth period following the third period, and the second common control signal of the turn-on level is input in the third period, and the second common control signal of the turn-off level is input in the first period, the second period, and the fourth period.

13. The gate driver of claim 12, wherein the emission pulse of the turn-off level is generated in the first and second periods, and the emission pulse of the turn-on level is generated in the third and fourth periods.

14. The gate driver as claimed in claim 12, wherein each of the selection units comprises:

a first TFT configured to establish a current path between an input terminal receiving the scan pulse and the first output node in response to the selection signal, a second TFT configured to establish a current path between an input terminal receiving the third clock and the second output node in response to the selection signal, a third TFT configured to establish a current path between the first output node and an input terminal receiving a first DC driving voltage (EVSS) in response to the first common control signal (SEB), a fourth TFT configured to establish a current path between an input terminal receiving a second DC driving voltage (EVDD) and the second output node in response to the first common control signal (SEB), a fifth TFT configured to establish a current path between the input terminal receiving the second DC driving voltage (EVDD) and the first output node in response to the second common control signal, and a sixth TFT configured to establish a current path between the second output node and the input terminal receiving the first DC driving voltage (EVSS) in response to the second common control signal.

* * * * *